United States Patent
Raiciu et al.

(10) Patent No.: US 12,457,168 B2
(45) Date of Patent: Oct. 28, 2025

(54) METHOD FOR VERIFYING DATA CENTER NETWORK PERFORMANCE

(71) Applicant: Avago Technologies International Sales Pte. Limited, Singapore (SG)

(72) Inventors: Costin Raiciu, Bucharest (RO); Mark James Handley, Kingston (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/612,347

(22) Filed: Mar. 21, 2024

(65) Prior Publication Data

US 2024/0235988 A1 Jul. 11, 2024

Related U.S. Application Data

(63) Continuation of application No. 17/515,533, filed on Oct. 31, 2021, now Pat. No. 11,968,115.

(51) Int. Cl.
*H04L 45/24* (2022.01)
*H04L 43/0852* (2022.01)
(Continued)

(52) U.S. Cl.
CPC .......... *H04L 45/24* (2013.01); *H04L 43/0852* (2013.01); *H04L 45/123* (2013.01);
(Continued)

(58) Field of Classification Search
CPC ... H04L 45/24; H04L 43/0852; H04L 45/123; H04L 45/22; H04L 47/122; H04L 47/125;
(Continued)

(56) References Cited

U.S. PATENT DOCUMENTS 6,594,701 B1 * 7/2003 Forin .................... H04L 47/193
 711/E12.067
7,808,983 B2 10/2010 Joly
(Continued)

FOREIGN PATENT DOCUMENTS

WO WO-2012/135442 A1 10/2012
WO WO-2020/236302 A1 11/2020
WO WO-2022/023849 A1 2/2022

OTHER PUBLICATIONS

Handley Mark et al., "Re-architecting datacenter networks and stacks for low latency and high performance", SIGCOMM '17, Aug. 21-25, 2017, Los Angeles, CA, USA, pp. 29-42.
(Continued)

*Primary Examiner* — Abdulkader M Alriyashi
(74) *Attorney, Agent, or Firm* — Foley & Lardner LLP

(57) ABSTRACT

Packets in a data communications network are encapsulated by an encapsulation module on a sending computer and decapsulated on the receiver computer, the transmission of data packets being controlled by credit sent by the receiving computer to avoid causing congestion. The encapsulation module varies fields in the packets that are used by switches to determine the path to the destination, so as to distribute the load of a transfer across a plurality of paths to the receiving computer. The sending and receiving computers use per path packet delivery, loss, latency and packet trimming information to detect abnormal network behavior and submit alerts and summary statistics to a monitoring station. The monitoring station uses this information to detect network bottlenecks and other faults and to localize them to specific switches or links.

20 Claims, 3 Drawing Sheets

Encapsulation and Decapsulation

(51) Int. Cl.
  *H04L 45/00*   (2022.01)
  *H04L 45/12*   (2022.01)
  *H04L 47/122*  (2022.01)
  *H04L 47/125*  (2022.01)
(52) U.S. Cl.
  CPC ............ *H04L 45/22* (2013.01); *H04L 47/122* (2013.01); *H04L 47/125* (2013.01)
(58) Field of Classification Search
  CPC ..... H04L 47/11; H04L 47/83; H04L 41/0631; H04L 41/0816; H04L 41/0896; H04L 43/06; H04L 43/0864; H04L 43/50; H04L 41/0677; H04L 41/142; H04L 43/10; H04L 43/0829; H04L 43/0876; H04L 41/147
  See application file for complete search history.

(56) References Cited

U.S. PATENT DOCUMENTS

| | | | |
|---|---|---|---|
| 8,880,681 B2 | 11/2014 | Moncaster et al. | |
| 8,937,950 B2 | 1/2015 | Dunbar et al. | |
| 9,019,990 B2 | 4/2015 | Jaiswal et al. | |
| 9,084,132 B2 | 7/2015 | Briscoe et al. | |
| 9,369,398 B2 | 6/2016 | Chan et al. | |
| 9,497,039 B2 | 11/2016 | Greenberg et al. | |
| 9,509,616 B1 * | 11/2016 | Judge | H04L 47/20 |
| 9,544,239 B2 | 1/2017 | Gafni et al. | |
| 10,038,766 B2 | 7/2018 | Pfister et al. | |
| 10,044,628 B2 | 8/2018 | Chan et al. | |
| 11,290,380 B2 | 3/2022 | Raiciu et al. | |
| 2005/0243834 A1 | 11/2005 | Fukuda | |
| 2010/0095021 A1 | 4/2010 | Samuels et al. | |
| 2010/0322249 A1 | 12/2010 | Thathapudi et al. | |
| 2019/0104207 A1 | 4/2019 | Goel et al. | |
| 2020/0358886 A1 | 11/2020 | Wei et al. | |
| 2020/0366610 A1 | 11/2020 | Wang | |
| 2021/0119930 A1 | 4/2021 | Debbage et al. | |
| 2021/0258347 A1 | 8/2021 | Batta et al. | |
| 2021/0297350 A1 | 9/2021 | Vegesna et al. | |

OTHER PUBLICATIONS

International Search Report and Written Opinion for PCT/IB2022/059708, mailed Dec. 23, 2022; 15 pages.

* cited by examiner

FIG. 2 Encapsulation and Decapsulation

METHOD FOR VERIFYING DATA CENTER NETWORK PERFORMANCE

CROSS-REFERENCE TO RELATED PATENT APPLICATIONS

This application is a Continuation of U.S. application Ser. No. 17/515,533, filed Oct. 31, 2021, incorporated herein by reference in its entirety.

BACKGROUND

The present invention relates to a method for transferring information across a data center network, and in particular to networks consisting of a plurality of packet switches that provide a plurality of possible paths from a source computer to a destination computer. The invention provides continuous monitoring of network performance, so that failures within the network can be quickly discovered and their cause localized.

Data center networks interconnect large numbers of computers and are constructed from a multitude of interconnected network switches. Examples of such switches are Ethernet switches, Infiniband switches and IP routers. To interconnect large numbers of computers, many switches are interconnected in such a way that if two computers are not directly connected to the same switch, then there are multiple paths though the network that packets of data sent between those computers might traverse.

One way to determine which path a packet takes is for the switches to run a routing protocol so as to determine multiple possible paths to the destination computer, and then to use a hash function of fields from the packet to choose between paths. If the fields being hashed have the same values in all the packets of an information transfer, then all the packets will traverse the same path through the network, and so will typically arrive in the order in which they were sent.

Having packets arrive in the correct order helps network performance because computers often use conventional legacy network protocols such as the Transmission Control Protocol (TCP) to manage the transfer of data. TCP generally loads the network to capacity until a queue in a network switch overflows. At this point a packet will be lost, and TCP infers from this loss that it should reduce the transmission rate. When packets arrive out of order, TCP can mistake this for loss and performance can suffer. TCP's requirement to fill a queue to sense network capacity also increases latency across the network for other packets that traverse the same queues.

When switches use a hash to route all the packets of an information transfer to a single path, if many flows between different computers hash to paths that traverse the same network link, this can cause congestion, even if other possible paths had spare capacity. This can cause the performance of the network to be hard to predict.

Another data center network protocol is Remote Direct Memory Access (RDMA). RDMA suffers performance problems when packets are lost, so it is common for a switch in a network deploying RDMA to tell the preceding switch or computer to pause sending more data until there is more link capacity available. This pausing can cause unnecessary latency for packets destined for other computers.

One key problem in datacenter networks is when a computer sends a request to many other computers for information and they all respond simultaneously, overloading the network link to the destination computer. This is known as an incast. Incast traffic can cause very high packet loss rates, or if loss is mitigated by using large switch buffers or pausing the preceding switch, can cause the queues in switches to grow excessively large, causing unnecessarily high latency.

In a large scale datacenter network there will commonly be one or more switch or link that has failed in some way. With many paths between each pair of computers, incast traffic causing loss and latency spikes, and each transfer using only a single pseudo-randomly chosen path, it is very difficult to know how well a transfer should perform. If a failure does not result in complete loss of communication it may only affect performance, and as performance is unpredictable, it may be hard to know a failure has occurred. Such problems can sometimes be revealed using a mesh of probe test traffic between different computers. Pingmesh is one such system. However, such probe test traffic needs to be sent at a low rate to avoid disrupting operational traffic. Many network performance problems do not easily reveal themselves until the network is heavily loaded, so there is a limit to what such test traffic can reveal.

pHost addresses the incast problem by having each sending computer send a request-to-send (RTS) packet to the receiving computer. Thereafter, the receiving computer sends tokens to the sending computers. The sending computer then controls its sending rate based on information from the tokens. The receiving computer regulates the transmission of tokens so that the aggregate arrival rate of data at the receiving computer does not overwhelm the receiver's network link.

NDP addresses these problems by replacing the entire network transport protocol with a new protocol and by modifying the network switches. Once a queue in a switch reaches a certain size, new arriving packets are trimmed so that the payload is removed and only the NDP header remains. As the NDP header is small, many more trimmed packets can be sent than if they were not trimmed. These trimmed packets serve to tell the receiver which senders are trying to send. The NDP receiver then requests more data from the senders at a rate at which it can cope. In addition, because the switches do not often need to drop packets, different packets from the same transfer can be sent across different paths without the receiver confusing out-of-sequence packet arrival for packet loss.

Instead of using packet trimming or RTS, Aeolus sends the initial burst of traffic from a sender to a receiver using packets marked as low-priority. In there is no congestion near to the receiver, these packets will arrive normally. If there is congestion, these uncontrolled low-priority burst will have minimal impact on established flows, so greatly reduce the incast problem. In case all packets in the initial burst are lost, Aeolus also sends a normal priority probe packet after the low-priority burst, allowing the receiver to know a sender has become active in case all the low priority packets are lost.

pHost, NDP and Aeolus all rely on the receiver controlling access to the network; they differ in how this is done for the start of a transfer. By controlling access to the network, they reduce latency due to queuing and largely eliminate packet loss in the steady state. This makes network performance more predictable. NDP also sends different packets from the same transfer across different paths, evenly balancing load across the network paths. This further increases the predictability of network performance in the absence of network failures.

Despite such solutions, it can still be hard to understand why network performance is lower than expected. What is needed is a method for transferring data between computers in a data center in a performant and predictable manner, especially in the presence of incast traffic, such that the performance of network transfers can be continuously monitored and verified. This verification should be such that it reveals failures, faults, bugs and misconfigurations in the network that affect performance, and it should also reveal the location of the failure in the network. It is required that such monitoring be capable of revealing transient problems that will be missed by low-rate probing. Further, it is also required that legacy traffic such as TCP and RDMA can be carried across the network and that such traffic can also be used to probe for such performance problems in the network.

OBJECTS OF THE INVENTION

It is an object of this invention to enable the transfer of data across a data center network consisting of a plurality of network switches and network paths between computers in such a manner that high and predictable throughput can be achieved.

It is an additional object of this invention to allow the transfer of data across a data center network consisting of a plurality of network switches and network paths in such a manner that a wide range of problems within the network are detectable as abnormal by the sending or receiving computer using data transfers to probe the network.

It is an additional object of this invention that network traffic generated using legacy network protocols can be used to probe the network.

It is an additional object of this invention that during the transfer of data across a data center network, performance limitations due to the network are distinguishable from performance limitations due to the sending or receiving computer. In this manner, when maximum achievable network performance is less than expected, this can be reported for investigation.

It is an additional object of this invention that performance problems detected by senders and receivers in a data center network can be combined so that the location of the origin of failures and other performance problems within the network can be quickly discovered.

Still other objects and advantages of the invention will in part be obvious and will in part be apparent from the specification and drawings.

SUMMARY OF THE INVENTION

Traffic between a sender and receiver in a data center network can usually take many different paths. A failure or problem on one link or switch can impact performance, but if each transfer takes a single path, only a subset of transfers will be affected, making the problem intermittent. The present invention sends each packet with header fields that are read by the network switches and are used to determine a path through the network. By varying the header fields used by the switches to determine the path to the destination, a sending computer can influence which packets traverse which path through the data center and so balance load across multiple paths more effectively.

By comparing the arrival of packets arriving at the receiver along different paths from the same sender, the present invention allows for the receiver to identify problems that affect only a single or a subset of paths.

In the present invention, packet headers contain sequence numbers. When a packet is received at the receiver, an acknowledgment packet is sent back to the sender containing the sequence number from the received packet. The sender uses these acknowledgment packets to determine whether packets sent across each path arrived, and to infer the latency across the network on each path. In this manner, the sending computer can also detect problems within the network that affect only a subset of paths.

In the present invention, the receiver can delay sending acknowledgments to reduce network load, but in such cases will measure and report to the sender the associated delay such that the sender can make accurate path latency measurements.

In the present invention, after the first exchange of a transfer, the receiver sends control packets each sender to pace the transfer of the remainder of the traffic from the sender. In this manner, the receiver can control the incoming traffic rate from all senders so that it does not overload the receiver's incoming link. This allows switches to use small queues, controlling the latency across the network. The sender and receiver use differences in latency across the network via different paths to expose problems in the underlying network.

In one embodiment, when the queue in switches in the network overflows, the switch trims off the payload from packets and forwards only the header to the receiver. The sender and receiver use differences in the trim rate on different paths to expose problems in the underlying network.

In another embodiment, before first sending data, a sender requests permission to send from the receiver. In this manner, congestion within the network is greatly reduced so packet loss due to congestion becomes rare. The sender and receiver use differences in packet loss rate on different paths to expose problems in the underlying network.

In another embodiment, packets from legacy network protocols are encapsulated at the sender and decapsulated at the receiver. When the arrival rate of packets from the legacy protocol exceeds the rate the receiver wishes to receive data, packets are queued at the sending computer before being sent when the receiver requests them. In this manner the network is not overloaded by the legacy network protocol, and so the sender and receiver can monitor the network for faults using the aforementioned methods.

In another embodiment, packets from legacy network protocols are encapsulated at the sender before being send via multiple paths through the network. At the receiver, these packets are decapsulated and are placed into the original sending order before being released to the legacy network protocol at the receiver. In this manner the encapsulator at the sender and the decapsulator at the receiver can compare the different paths through the network using the aforementioned method so as to identify network faults without the legacy network protocol suffering performance problems due to packet reordering.

In another embodiment, the sending and receiving computers report measurements obtained on different paths to a monitoring station. The monitoring station then compares reports received from multiple senders and receivers and uses this information to locate the cause of problems in the underlying network.

In another embodiment, the sender and receiver monitor their own performance to identify when they are a performance bottleneck. They report time intervals when they are not the bottleneck to the monitoring station, allowing the monitoring station to identify when the network is not performing as it should.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

It is to be recognized by one of skill in the art that the terms "software," "app," "module," "routine," or "sub-routine" may be used interchangeably in this specification to describe a software or component parts thereof. In some embodiments of the present invention, each described module or routine/sub-routine is a component part of a larger set of software instructions while in other embodiments each described module or routine/sub-routine act as independent software applications.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
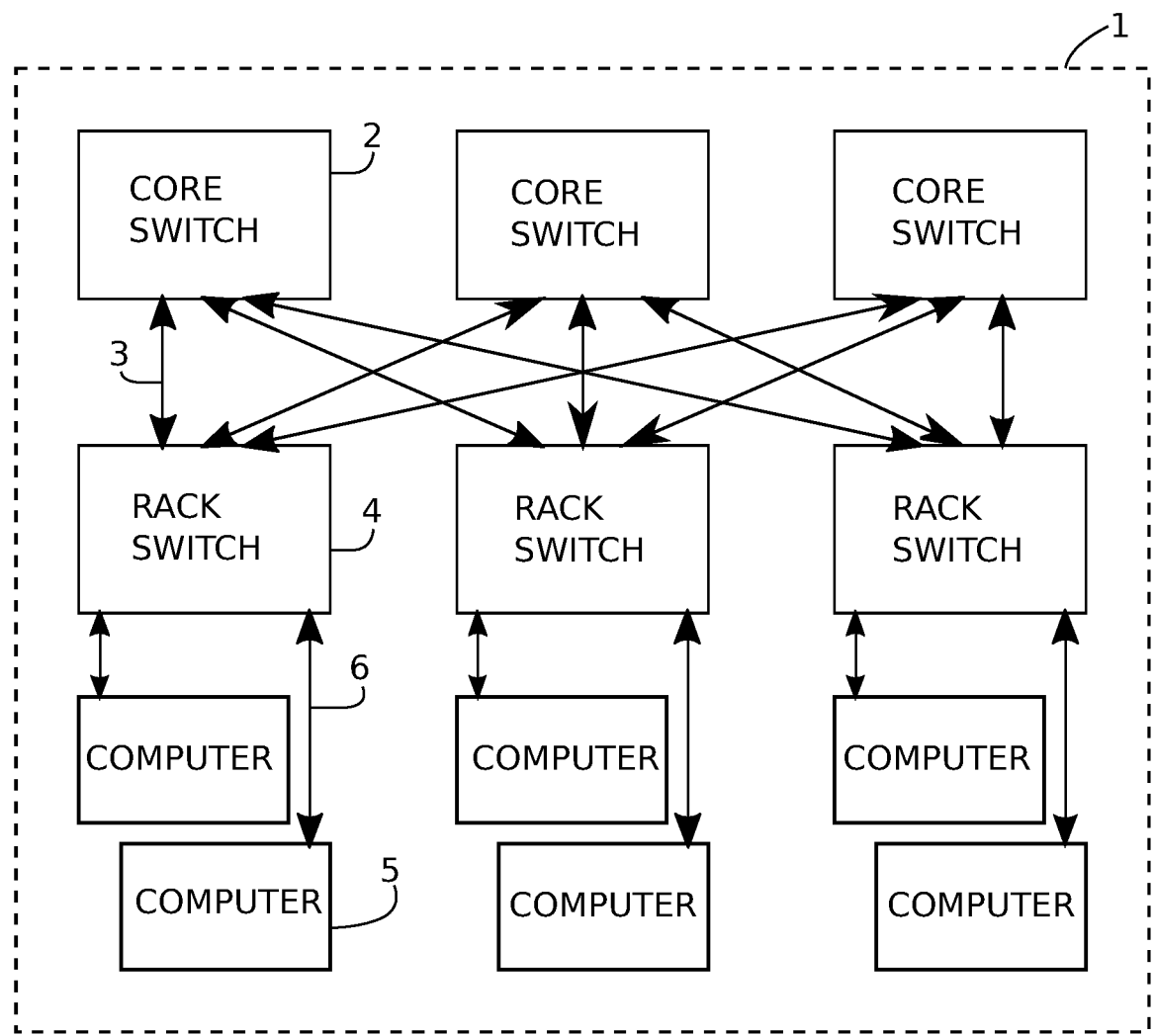
FIG. 1 is an example of a data center network topology.

FIG. 1 shows an exemplary data center network [1], as known in the art. A plurality of computers [5] are connected to edge switches [4] via network links [ ]. Edge switches are themselves interconnected via inter-switch links [3] to other network switches [2]. In this way packets of data sent by a computer connected to one switch may be forwarded to a computer connected to a different switch via a plurality of network paths. It will be understood that data center topologies in which the present invention is used will encompass many more computers connected to each switch, more switches and more layers of switches than shown in FIG. 1, and that different topologies are also possible.

It is common in prior art for a flow of packets from one computer to another computer to take a single path through the network to avoid being reordered. Legacy network protocols such as TCP can mistake reordering for packet loss, causing performance problems by incorrectly retransmitting packets or by reducing the transmission rate due to interpreting loss as a signal of congestion.

In prior art, it is common for the path to be selected from among the many possible paths by switches hashing fields from the packet header to select between possible paths to the receiver. When the hashed fields remain constant for packets within a transfer but differ between transfers, the result of such hashing is that each transfer of data uses a single path but different transfers take different paths through the network. This has the effect that the different links in the network core are loaded unequally, which can result in some links being congested despite there being spare capacity on other paths to the same destination. Such congestion causes performance to be variable, making it hard to predict the speed of a data transfer.

A particular problem in data centers is incast traffic patterns, when many senders attempt to send to a single receiver simultaneously. Such incasts cause congestion, typically leading to packet loss as queues close to the receiver overflow, or very high latency as large switch buffers are used to absorb the arriving burst.

In large data centers with very large numbers of switches and links, there will almost always be switches or links that are not performing correctly. Examples include links that have excessively high bit error rates resulting in packet losses, links that have negotiated to a lower bitrate that intended, or switches that have selected suboptimal routes to a destination.

The combination of assigning each transfer a single path selected pseudorandomly by hashing, different transfers sometimes colliding on the same link, incast traffic patterns and various forms of failure or partial failure within the network makes it very difficult to predict how well a transfer across the network will perform. The present invention improves the predictability of network performance by addressing the aforementioned problems, and so enables transfers across the network to be monitored at the sending and receiving computers so that performance problems can be identified and their cause located.

In the preferred embodiment of the present invention different packets of a single flow are deliberately sent over different paths through the network so as to loadbalance traffic across multiple paths and avoid inadvertent congestion. The sending computer varies one or more of the fields in the packet header for each packet so that when the switches calculate the hash function to select a path, different packets traverse different paths to the destination computer [5].

The sender varies the fields used to select the path to each destination with each packet in a transfer so as to load the different paths to the destination equally. In this manner, if the different paths from a sender to a receiver are of the same length and the link speeds along each path are equivalent, then packets traversing them will experience similar latency and similar congestion.

When a data packet arrives at the receiver, the receiver sends acknowledgment packets to the sender acknowledging receipt, as is common in the art. In the present invention, the sender uses these acknowledgment packets to compare the paths to the receiver. When it sees that the packet loss rate on a path is different from that on other paths, it raises an alert that there is a loss problem on that path. Similarly, if the round trip time, as measured from when a packet was sent until its acknowledgment arrives, is significantly greater on one path than on other paths, it raises an alert that there is a latency problem on that path.

Figure 2:
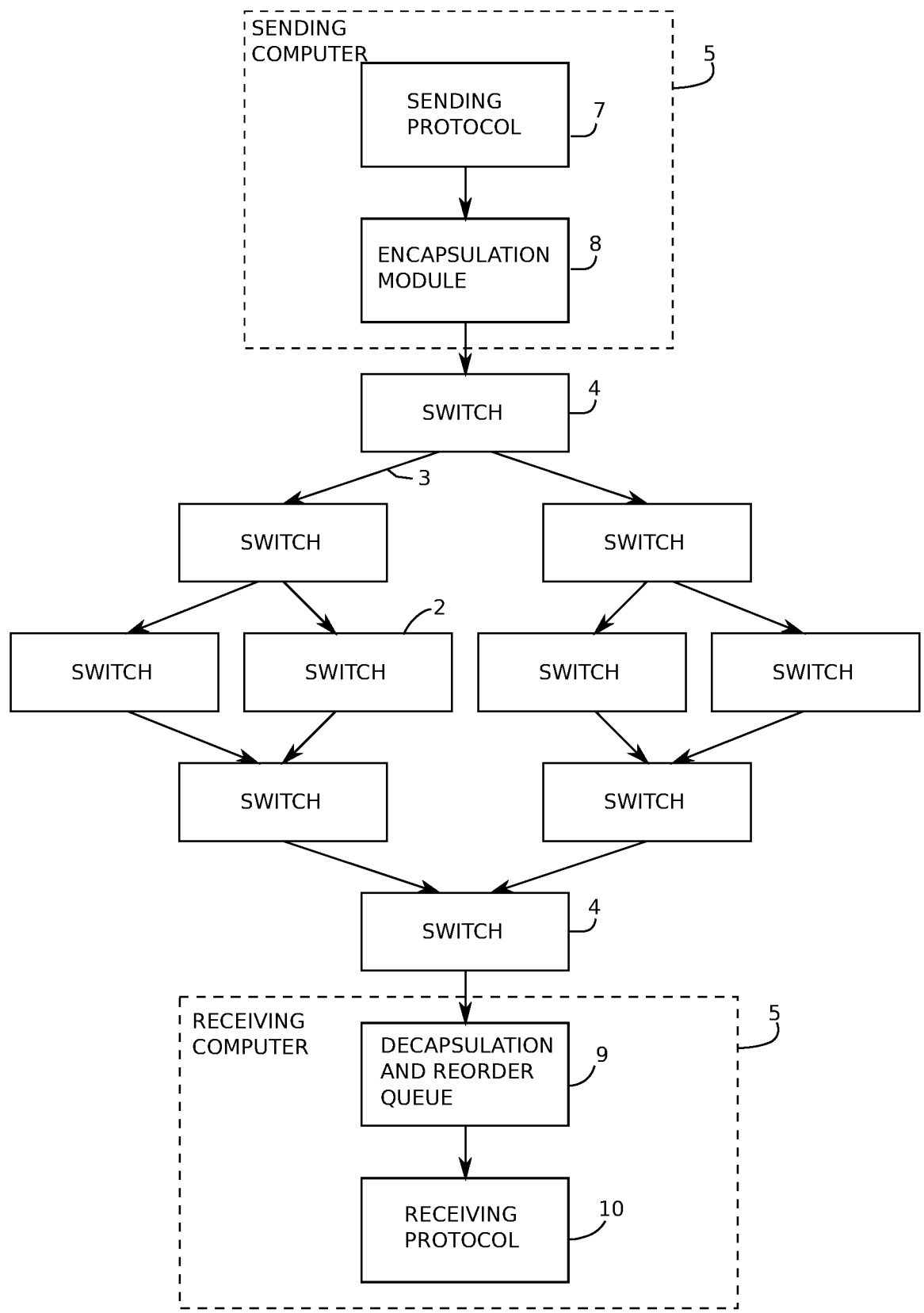
FIG. 2 shows where encapsulation, decapsulation and the reorder queue take place.
Figure 3:
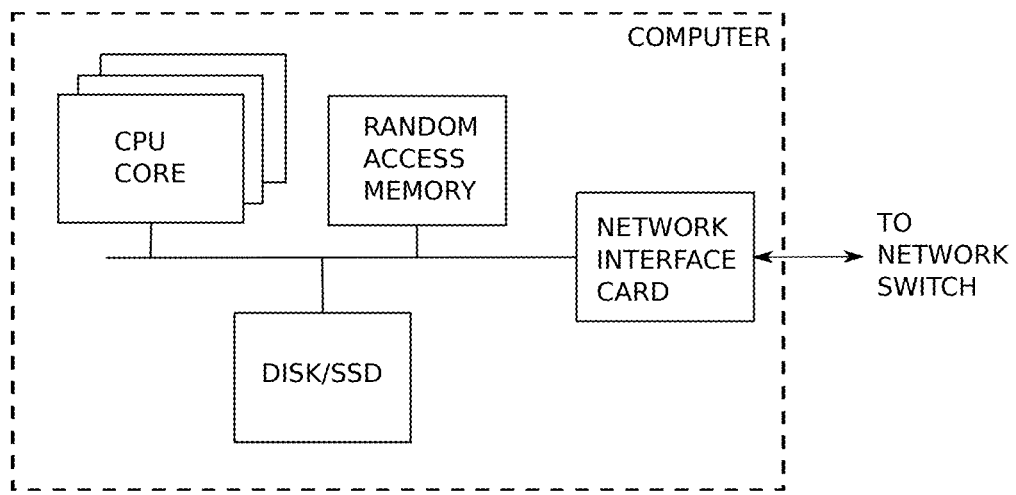
FIG. 3 shows the main components of a sending or receiving computer.
Figure 4:
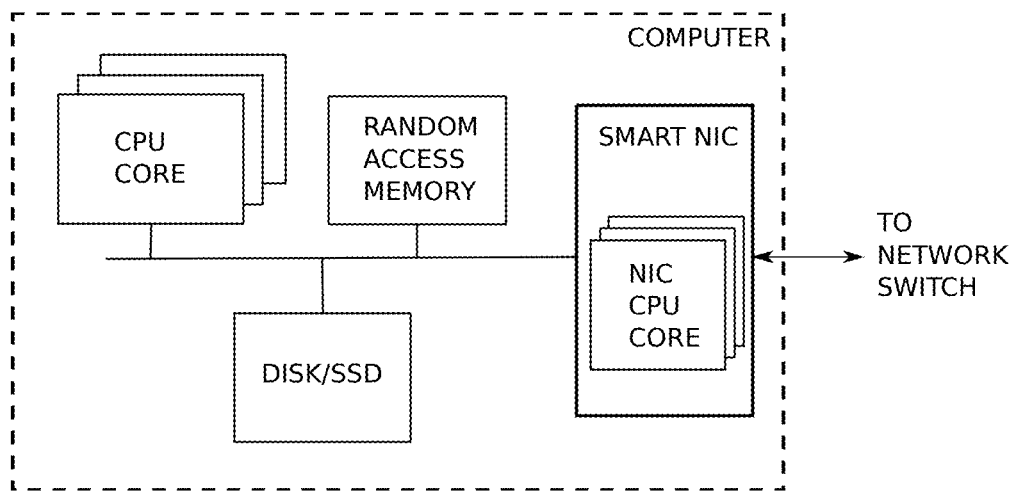
FIG. 4 shows the main components of a sending or receiving computer with a smart NIC.

In a preferred embodiment, shown in FIG. 2, the encapsulation module [8] in the sending computer adds sequence numbers to the packets before transmission, and the decapsulation module [9] uses these sequence numbers to reorder arriving packets back into the original order before passing them to a higher level protocol [10]. For example, the sending computer might encapsulate TCP packets sent by the operating system on the sending computer within User Datagram Protocol (UDP) packets and add an additional header containing a sequence number. The encapsulation module [8] varies fields in the packet headers so that the flow of packets is load-balanced across multiple network paths that traverse multiple switches [2]. This can be achieved by the sending computer encapsulating data using the UDP and by varying the UDP source port, or by using other encapsulations and varying fields within the packets so as to direct different packets over different paths.

On arrival at the receiving computer, the decapsulation and reorder queue [9] removes the additional packet headers and if the packet has arrived out of sequence, it is queued briefly to allow preceding packets that followed different paths to arrive. The additional sequence numbers are then used to reorder the packets back into the original order. Only then are the packets released to the receiving protocol [10]. In one preferred embodiment, the receiving protocol [10] is TCP receiving software running on the receiving computer. The receiving protocol [10] then processes the packets without knowing they traversed different paths through the network. In this way, data can be load-balanced across multiple network paths without requiring operating system or application software to be modified, while using a standardized network protocol.

It will be understood that such encapsulation of packets between the sending protocol [7] and the receiving operating system [10] is not limited to TCP packets. Packets sent by other network protocols can also be encapsulated in this way including but not limited to UDP and RDMA packets. It will also be understood that other encapsulations than UDP may be used by the encapsulation module [8] to encapsulate packets sent between the sending protocol [7] and receiving protocol [10], so long as fields in the encapsulation header can be varied so as to balance traffic across multiple paths. Alternatively, various forms of source routing are known in the art and can be used by the encapsulation module [8] to control the paths taken by packets.

When data packets arrive at the receiver destined for a legacy protocol such as TCP, they will often arrive out of sequence if they take different paths through the network. When all senders attempt to evenly load-balance packets across paths to their receivers, as in the current invention, and when the paths through the network are of equal length and link bitrates, the queues in intermediate switches on different paths will be of similar sizes, so the distance that packets are out of sequence on arrival at the receiver will be small. The receiver maintains a reorder queue for such packets destined for legacy network protocols, so as to place the packets back in the sending sequence order before releasing them to the receiving legacy network protocol. In this manner the effects of reordering are hidden from the legacy protocol. When the network is operating normally, the distance by which packets are reordered will be small. However, if there is a problem on one of the paths that increases latency, then the amount of reordering will be greater for packets sent via this path. The receiver compares the reordering amount for packets sent by different paths, and raises an alert when one of the paths sees excessive reordering.

When data packets arrive at the receiver destined for a protocol that can cope with reordering, the receiver does not need to queue those packets to put them back in the original order. Instead it releases the packets immediately to the receiving protocol, but maintains the same per-path reordering statistics that it would maintain if it had queued the packets. In this manner it can still compare the latency across the multiple paths and raise a latency alert without unnecessarily delaying packet arrivals.

In another embodiment, the decapsulation module [9] can be extended to send acknowledgment packets to the encapsulation module [8] module when encapsulated data packets arrive. On receipt of these acknowledgment packets, the encapsulation module [8] measures the packet loss rate and round trip time on each path taken by the data packets it sent. When the encapsulation module [8] sees that the packet loss rate on a path is different from that on other paths, it raises an alert that there is a loss problem on that path. Similarly, if the round trip time, as measured from when a packet was sent until its acknowledgment arrives, is significantly greater on one path than on other paths, it raises an alert that there is a latency problem on that path. In such a manner, the encapsulation module [8] module can detect network problems, even when the sending protocol [7] does not vary the relevant fields in the packets so is unaware that its packets take multiple different paths through the network.

In a preferred embodiment, after the first round trip time of a transfer, the sender waits for the receiver to send control packets conveying credit. This credit indicates that the receiver wishes the sender to send more packets. Credit may be expressed in terms of the number of packets or in terms of the number of bytes that the sender is requested to send.

When a sender receives credits, it will record the amount of credit given to it by the receiver. It then sends a number data packets up to that indicated by the credit, decrementing the recorded credit by an amount equivalent to each packet sent, until insufficient credit remains. At this point the sender ceases to send encapsulated data packets until it receives more credit from the receiver.

This credit mechanism permits the sender to control which sending computer [5] is permitted to send packets to that receiving computer [5]. The receiver paces the sending of credit so that the incoming data packets it elicits do not exceed the link speed of the network link to that receiver.

As each credit message sent permits a sender to send the equivalent amount of data to the receiver, the incoming data rate at the last switch [4] will then approximately equal the bitrate of the incoming link [6], avoiding a queue building in the switch [4] and so minimizing the buffer size required in that switch [4] and preventing packet loss due to congestion. When the network is functioning normally, the core of the network is properly provisioned to avoid overload, and the senders evenly load-balance packets across all the paths to the destination, the use of credit in this manner has the effect of minimizing packet loss and maintaining low latency across the network in the steady state.

While credit messages avoid congestion in the steady state, the present invention adds additional mechanisms to avoid problems due to congestion at the start of a transfer, before the first receiver credit arrives. A number of mechanisms known in the art can achieve this, including but not limited to the following.

In the first mechanism, the sender sends a small request-to-send control packet to the receiver, informing the receiver that it wishes to send data to the receiver and optionally how much data it wishes to send. The receiver then starts sending credit packets to the sender to initiate the transfer. In this manner, incast traffic patterns do not overload the link to the receiver.

In the second mechanism, the sender sends the first round trip of data at high speed, but marks the packets as low priority. Switches in the network then prioritize forwarding normal priority packets over low priority ones. In this manner, when many senders start sending to one receiver simultaneously, the low priority packets may overflow the queue at the link to the receiver, but they do not displace normal priority packets. This ensures normal priority packets still experience low latency and low packet loss rates.

The second mechanism can be combined with the first mechanism, so that if all the low priority packets from a sender to a receiver are dropped at the edge switch, the receiver still knows that the sender wishes to send, and so the receiver then starts sending credit packets to that sender.

In the third mechanism, the sender sends the first round trip of data at high speed with normal priority. In an incast, this will overflow the queue at the edge switch, causing packet loss. The switch queues are configured to be short so as to ensure latency is low, but as a result, they will overflow quickly. To avoid the resultant high packet loss during an incast being a problem, when the queue starts to fill, the switch trims off the payload of the packets, forwarding only the header. In this manner, the network is effectively lossless for metadata, but not for data. On receipt of a trimmed packet, the receiver sends negative acknowledgment (NACK) packets to inform the sender that the payload did not arrive, and the sender queues the packet for retransmission when it has acquired sufficient credit from the receiver. This mechanism can be further enhanced by forwarding trimmed header packets and NACK packets with high priority, reducing the latency by which a sender discovers it needs to queue a packet for retransmission.

The three mechanisms can be used together in a single sending computer or receiving computer, with different mechanisms used depending on the source or destination of the traffic, or just one or two may be implemented on all computers in a datacenter. All three mechanisms serve the same purpose when combined with the sending of credit messages by the receiver, which is to allow the switches to run small queue sizes without incast traffic patterns causing uncontrolled traffic to enter the network for long periods of time. As a result, the latency across the network is guaranteed to be low so long as the network switches and links are functioning correctly.

On receipt of data packets, the receiver sends acknowledgment packets to the sender to indicate receipt. As the switch queues are small, the round trip time in a properly functioning network between sending a data packet and receiving the corresponding acknowledgment packet is guaranteed to be small. In the worst case the round trip time will be the maximum queuing delay at each switch, plus the packet serialization time at each switch, plus link latency. Within a datacenter, this worst case latency will be dominated by worst case queuing delay, and so by keeping switch queues small, the network latency becomes much more predictable. In practice, so long as the network is properly provisioned, it is extremely unlikely that more than two queues between the sender and receiver are full enough to experience worst-case queuing delay. Thus the sender can measure the round trip time to each receiver, and if it exceeds the expected worst case delay, then it will raise an alert indicating that the network is experiencing a problem.

When combined with per-packet load balancing in a datacenter network, the sender will also record which paths are affected by the latency increase, so that the location of the problem can be identified. A key advantage of keeping the queues small in this manner is that network problems can still be detected even when all paths are affected. This typically indicates that the problem is at the first or last network link or switch.

In order for the sender and receiver to use data traffic to monitor network health, they maintain a set of invariants. When an invariant is violated, this indicates a likely network problem, and so a alert is raised. The precise set of invariants depends on the mechanism used to initiate a data transfer.

When request to send is used, the set of invariants may include:

1. The loss rate is approximately equal on all paths. This invariant can be measured at the sender when data remains unacknowledged after a timeout period. To do so the sender must keep track of the path taken by each packet, so it can associate a path identifier with both packets that arrive at those that were lost.
2. The overall loss rate is very close to zero. This invariant can be measured at the sender when data remains unacknowledged after a timeout period, and at the receiver from gaps in the sequence number space.
3. The round trip time measured at the sender using acknowledgments from the receiver for packets that arrive without being retransmitted is less than k1 round trip times, where k1 is a small constant that depends on the configured maximum queue sizes. With small queues, k1 will be less than ten.
4. The average round trip time measured at the sender for packets that arrive without being retransmitted is approximately equal for all paths used to reach the destination.
5. The IP time-to-live field on packets arriving at the receiver is equal for all packets from a sender on all paths.

When low priority packets are used during the first round trip time, the same set of invariants can be used for normal priority packets that are sent when requested by the receiver using credit. There is no expectation that the loss rate of low priority packets will be low.

When packet trimming is used, the set of invariants may include:

1. The overall loss rate is very close to zero. This invariant can be measured at the sender when data remains unacknowledged after a timeout period, and at the receiver from gaps in the sequence number space. Trimmed packets are not considered lost for these invariants.
2. The round trip time measured at the sender using acknowledgments from the receiver for packets that arrive without being retransmitted is less than k round trip times, where k is a small constant that depends on the configured maximum queue sizes. With small queues, k will be less than ten.
3. The average round trip time measured at the sender for packets that arrive without being retransmitted is approximately equal for all paths used to reach the destination.
4. The IP time-to-live field on packets arriving at the receiver is equal for all packets from a sender on all paths.
5. The trimming rate is approximately equal on all paths. This invariant is measured directly at the receiver and measured from NACK packets at the sender.

6. The trimming rate measured at the receiver is close to zero when all senders to that receiver are in steady state with their traffic being triggered by credit from the receiver.
7. When a reorder queue is used at the receiver, the distance that packets arrive out of order should be approximately equal on all paths.
8. When a reorder queue is used at the receiver, gaps in the sequence space of packets waiting to be reordered can be caused by loss, trimming, or packets arriving late due to variations in one-way path latency. Loss will be almost zero, and gaps due to trimming can be identified by the arrival of the trimmed packet header. The remaining gaps due to variable path latency will be filled within a short time period t. The value of t will depend on configured switch queue sizes, but will normally be short, typically around mean two round trip times.

In a preferred embodiment, the aforementioned receiver credit mechanism is combined with encapsulation as shown in FIG. 2. The encapsulation module [8] measures the sending data rate achieved. There are several distinct steady state conditions that the encapsulation module [8] can identify, though in many cases the situation may be dynamic and no steady state condition may exist.

1. Credit is arriving from the receiver at a higher rate than the achieved data rate, but data is not always available at the encapsulation module [8] to be sent. In this case the sending protocol [7] is the limiting factor. This is a normal case, as often the application will have no more data to send.
2. Credit is consistently arriving from the receiver at a higher rate than the achieved data rate, and data from the sending protocol [7] is consistently available queued at the encapsulation module [8] ready to be sent. In this case the encapsulation module [8] is the bottleneck.
3. Credit is consistently arriving from the receiver at a rate which matches the achieved sending data rate. In such a case, neither the sending protocol [7] nor the encapsulation module [8] is the bottleneck. The network or the receiving computer is then the bottleneck.

In each case, where the condition persists, the encapsulation module [8] logs the achieved sending rate and the time duration during which that condition applied.

The decapsulation module [9] also measures the arrival rate of data from each encapsulation module [8] sending to it. There are several distinct steady state conditions that the decapsulation module [9] can identify.

1. The arriving data rate from a particular encapsulation module [8] matches the rate of credit the decapsulation module [9] sent to that encapsulation module. In this case, the bottleneck from that sender is the rate of credit sent by the decapsulation module [9].
2. The arriving data rate from a particular encapsulation module [8] is less than the rate of credit the decapsulation module [9] sent to that encapsulation module. In this case, the bottleneck is not at the decapsulation module [9].

When the bottleneck is not at the decapsulation module [9] for any active sender to that decapsulation module[9], either the network or at least one sending computer is the bottleneck. In each case, where the condition persists, the decapsulation module [9] logs the achieved sending rate and the time duration during which that condition applied.

By comparing sender and receiver logs, it is possible to identify overlapping periods of time where neither the senders not the receiver consider themselves to be the bottleneck. During such time periods, the network between the sender and receiver will be the bottleneck. As the link speeds in a datacenter are known, the achieved data rate during such time intervals should match the available capacity. When the achieved data rate is less than the available capacity, this indicates either that the network core is congested or that the network is performing below the expected capacity. In either case the time period and data rate during the event is logged for analysis.

In a preferred embodiment, the sending and receiving computers report logged performance events and violations of invariants to a monitoring station. It will be understood that the monitoring station may consist of one or more computers acting as a distributed system.

The monitoring station compares reports from many senders and receivers and uses these reports to localize network problems. When the monitoring station receives a report of an invariant violation, the violation may be associated with one or more paths from the sender to the receiver. The monitoring station maintains a network map, either through configuration information, through communicating with the switches directly, or through participating in the network routing protocol.

In a network topology such as that in FIG. 2 or FIG. 1, if there is a problem that affects all paths from a sender to a receiver, the problem will likely be located at one or the other edge switch [4] or edge link [6]. As each computer typically communicates with many other computers over time, if the problem is at the sending computer's edge switch [4] or edge link [6], the same problem will be reported when that sending computer communicates with different receivers. Similarly, if the problem is at the receiving computer's edge switch [4] or edge link [6], the same problem will be reported when that receiving computer receives from other senders.

If the problem only affects a subset of paths, then the cause of the problem will be nearer to the core of the network. In a network topology such as that in FIG. 2 or FIG. 1, when a report is received concerning a particular sender sending to a particular receiver, the location of the problem can be localized to two possible locations if it affects more than just a single path, or to a single core switch [2] or pair of core links [3]. This localization is performed by eliminating all measured paths from the sender to the receiver that do not exhibit the problem. Along the remaining paths that do exhibit the problem, the cause will be located at the point those paths diverge or converge. In general, it requires reports from at least two computers sending over two overlapping paths to uniquely identify the location of the problem.

If the encapsulation module [8] uses one of the forms of source routing known in the art, it will be able to report the paths through the network that do and do not exhibit a problem. If the switches utilize hashing to determine which of multiple paths are used, as is common in the art, the encapsulation module [8] or decapsulation module [9] will know which values of header fields correspond to paths with problems, but will not directly know which path these values correspond to.

Consider, for example, an encapsulation format whereby the encapsulation module [8] pseudo-randomly chooses the value of an 8-bit field (the path-ID) for each packet, and the switches hash this field to determine which path to the destination is taken. In this case the mapping of each path-ID value to the corresponding path is not known to the encapsulation module [8]. To discover this mapping, the encapsulation module [8] can perform a traceroute, as known in the art, to determine the switches along the path for each value of the path-ID field. Traceroute works by sending successive packets with the IP time-to-live field set to one, two, three, and so forth. Each switch decrements the TTL on a packet, and when it reaches zero, the packet is dropped and an ICMP time-exceeded-in-transit message is sent back to the sending computer [5] from the switch that drops the packet. These messages allow the encapsulation module [8] to reconstruct the full path from sending computer [5] to receiving computer [5].

To map all the paths from a sending computer [5] to a receiving computer [5], a traceroute need to be performed for each path-ID using that path-ID in the traceroute packets so they follow the same path as the encapsulated data packets. To perform this mapping for an eight-bit pseudo-random field and a path length of p requires sending 256 times p packets, which may be excessive. In the present invention, the sender can optimize this discovery process when it operates in a regular topology such as shown in FIG. 1 or FIG. 2. In such datacenter networks a path from sending computer [5] to receiving computer [5] is uniquely determined by which core switch [2] it traverses. Thus, for each path-ID value the sender need only send a single packet with the TTL field set so it expires at the core switch [2], and this is sufficient to associate that path-ID value with the full path via that core-switch[2]. It will be understood that such a path-ID field need not be restricted to eight bits, and may be a combination of other fields including but not limited to the source port and destination port fields in a TCP or UDP packet header, or an IPv6 flow label.

When the encapsulation module [8] or decapsulation module [9] module detects that an invariant has been violated, by comparing the paths affected with those unaffected it can usually localize where the cause of problem is to two possible locations in the network. If all paths are affected, the problem most likely lies at one of the two edge links [6] or edge switches [4] between the sending computer [5] and the receiving computer [5]. If only the paths traversing a single core switch [2] are affected, then the problem most likely lies with the core switch [2] itself, or in either the link entering the core switch from the sending, or the link leaving the core switch towards the receiving computer. Between these two extremes, varying numbers of paths will be affected by a problem, with the problem most likely lying at just beyond the point where the bad paths diverge from the good ones on the way to the core switches, or just before the bad paths converge with the good ones on the way from the core switches to the destination. A single encapsulation module [8] or decapsulation module [9] module cannot, by itself, determine from such passive measurements which of the two likely locations is actually the source of the problem.

To remedy this ambiguity, the present invention utilizes a monitoring station. Whenever one of the aforementioned invariants is violated, the encapsulation module [8] or decapsulation module [9] module detecting the violation reports which path IDs it sees as good and which are bad to the monitoring station. The encapsulation module [8] may pro-actively trace the paths, or alternatively it may do so when asked by the monitoring station. It then reports the mapping from path IDs to paths to the monitoring station. In this manner, the monitoring station can build a map of the network annotated with likely locations of problems. When it receives two reports of problems from different sender/receiver pairs, the monitoring station may be able to use this information to localize a problem to a single location. If the paths from the two sender/receiver pairs only partially overlap, and only one of the two likely fault locations reported by each sender/receiver pair is common to both pairs, then the location of the problem can be localized to that common location.

In general, if there is a single new network fault, reports of invariant violations from two encapsulation modules [8] or decapsulation modules [9] may be sufficient to perform such fault localization, but localization may require reports from additional encapsulation or decapsulation modules if the paths do not overlap, or if they overlap at both likely problem locations.

If there are two or more faults in the network, these may be localized in one of two ways. First, if the faults occur at different times and the first fault persists, the first fault can be localized, and then the second fault can additionally be localized using the changes in the affected paths. This proceeds in the same way as before, but any bad paths that traverse the first fault location are ignored when localizing the second fault.

Second, if two sender/receiver pairs report problems and there are four likely problem locations, where no good path from the first sender/receiver pair traverses the likely problem locations reported by the second sender/receiver pair, and vice-versa, then there are likely to be two problems rather than one. Additional reports from two more sender/receiver pairs whose paths overlap partially with one or the other original sender/receiver pair will be needed to localize the two distinct problem locations.

Such correlated problem reports may be inconsistent if problems are intermittent and brief, preventing the monitoring station from performing accurate localization quickly. As more reports arrive at the monitoring station from additional encapsulation or decapsulation modules [9], the confidence of a diagnosis will increase if the likely reported problem locations overlap with the already suspected problem location. In this way, even intermittent problems can eventually be localized.

When an encapsulation module [8] knows that it is not the bottleneck because it has a significant amount of data to send and sends data whenever credit is available, it may send periodic summary statistics to the monitoring station reporting the data rate sent in each time interval. Similarly, when a decapsulation module [9] knows that it is not the bottleneck because it is sending credit at its line rate and not dropping packets in its reorder queue, it may send periodic summary statistics to the monitoring station reporting the incoming data rate received in each time interval. The monitoring station can compare these reports, looking for time intervals where neither the encapsulation module [8] nor the decapsulation module [9] is the bottleneck, but the throughput is less than expected. The monitoring station can know what link capacities are, either from configuration information, or from communicating directly with the switches [4][2] along the paths via their management interfaces. In this manner, the monitoring station can detect when performance violates expectations and report such violations as potential problems. Such problems may result from the network being under-provisioned for the aggregate offered load, from prior failures that are no longer on active paths due to routing changes that reduce network capacity to less than intended, or from a range of different failures. Unlike invariant-based problem reports, such summary report data provides visibility into overall network health that is otherwise hard to obtain.

It will be understood that the monitoring station may comprise more than one physical computer system [5] acting as a distributed system, as known in the art. In such a manner, reports from encapsulation modules [8] and decapsulation modules [9] to the monitoring station may be kept local to their part of the network, reducing overall network load. Such a distributed monitoring station has the advantage of being fault tolerant and able to cope with higher reporting levels.

Those of ordinary skill in the art will understand and appreciate the aforementioned description of the invention has been made with reference to certain exemplary embodiments of the invention, which describe method for verifying data center network performance. Those of skill in the art will understand that obvious variations in construction, material, dimensions or properties may be made without departing from the scope of the invention which is intended to be limited only by the claims appended hereto.

What is claimed is:

1. A method comprising:
communicating, by a sending computer to a receiving computer, data packets, the sending computer varying one or more values of one or more fields in a packet header of the data packets, wherein one or more switches, intermediary to the sending computer and receiving computer, selected based at least on the one or more values different paths of a plurality of paths for communicating the data packets to the receiving computer;
receiving, by the receiving computer, the data packets via the selected different paths, the receiving computer maintaining a credit total identifying an amount of data packets that sending computer is queued to send;
communicating, by the receiving computer to the sending computer, acknowledgement of receipt of the data packets and one or more control messages regarding a credit, wherein the credit identifies a number of data packets that the sending computer is permitted to send;
communicating, by the sending computer to the receiving computer, a quantity of data packets corresponding to the credit identified by the one or more control messages;
comparing, by the sending computer, a rate of credit arriving from the receiving computer to a data rate achieved by the sending computer; and
determine whether the sending computer or the receiving computer is a bottleneck.

2. The method of claim 1, further comprising including, by the sending computer, in the one or more fields a sequence number used to identify each data packet of the data packets.

3. The method of claim 1, wherein the one or more switches are further configured to use a function of the one or more values of the one or more fields of each data packet to select a path from the plurality of paths for communicating each data packet.

4. The method of claim 3, wherein the one or more switches are further configured to load balance the data packets across the plurality of paths.

5. The method of claim 1, further comprising communicating, by the receiving computer to the sending computer, one or more acknowledgement packets for acknowledgement of receipt of the data packets.

6. The method of claim 5, further comprising using, by the sending computer, the one or more acknowledgement packets to determine one of loss or latency information for each of the plurality of paths to the receiving computer.

7. The method of claim 1, further comprising encapsulating, by the sending computer, the packet header as an additional packet header distinct from packet headers of the sending protocol.

8. The method of claim 7, further comprising removing, by the receiving computer, the additional packer header of the data packets prior to processing by the receiving protocol.

9. A system comprising:
a sending computer, comprising one or more processors, in communication with a receiving computer via one or more switches over a plurality of paths;
wherein the sending computer is configured to vary one or more values of one or more fields in a packet header of the data packets communicated to the receiving computer, wherein the one or more switches select, based at least on the one or more values, different paths of a plurality of paths for communicating the data packets to the receiving computer;
wherein the receiving computer is configured to receive the data packets via the selected different paths, the receiving computer maintaining a credit total identifying an amount of data packets that the sending computer is queued to send;
communicate to the sending computer, acknowledgement of receipt of the data packets and one or more control messages regarding a credit, wherein the credit identifies a number of data packets that the sending computer is permitted to send; and
wherein the sending computer is configured to communicate to the receiving computer a quantity of data packets corresponding to the credit identified by the one or more control messages; and
wherein the sending computer is further configured to compare a rate of credit arriving from the receiving computer to a data rate achieved by the second computer to determine whether the sending computer or the receiving computer is a bottleneck.

10. The system of claim 9, wherein the sending computer is further configured to include in the one or more fields a sequence number used to identify each data packet of the data packets.

11. The system of claim 9, wherein the one or more switches are further configured to use a function of the one or more values of the one or more fields of each data packet to select a path from the plurality of paths for communicating each data packet.

12. The system of claim 11, wherein the one or more switches are further configured to load balance the data packets across the plurality of paths.

13. The system of claim 9, wherein the receiving computer is further configured to communicate to the sending computer, one or more acknowledgement packets for acknowledgement of receipt of the data packets.

14. The system of claim 13, wherein the sending computer is further configured to the one or more acknowledgement packets to determine one of loss or latency information for each of the plurality to the receiving computer.

15. The system of claim 9, wherein the sending computer is further configured to encapsulate the packet header as an additional packet header distinct from packet headers of the sending protocol.

16. The system of claim 15, wherein the receiving computer is further configured to remove the additional packer header of the data packets prior to processing by the receiving protocol.

17. A system comprising:

a sending computer, comprising one or more processors, in communication with a receiving computer via one or more switches over a plurality of paths;

wherein the sending computer is configured to:

vary one or more values of one or more fields in a packet header of the data packets communicated to the receiving computer, wherein the one or more switches select, based at least on the one or more values, different paths of a plurality of paths for communicating the data packets to the receiving computer;

receive, from the receiving computer, acknowledgement of receipt of the data packets received by the receiving computer from the selected different paths of the plurality of paths;

receive, from the receiving computer, one or more control messages regarding a credit, wherein the credit identifies a number of bytes that the sending computer is permitted to send, wherein the receiving computers maintain a credit total identifying an amount of bytes that the sending computer is queued to send; and communicate to the receiving computer a quantity of data packets corresponding to the credit identified by the one or more control messages;

comparing a rate of credit arriving from the receiving computer to a data rate achieved by the sending computer; and determine whether the sending computer or the receiving computer is a bottleneck.

18. The system of claim 17, wherein the sending computer is further configured to include in the one or more fields a sequence number used to identify each data packet of the data packets.

19. The System of claim 17, wherein the sending computer is further configured to use one or more acknowledgement packets received from the receiving computer to determine one of loss or latency information for each of the plurality to the receiving computer.

20. The system of claim 17, wherein the sending computer is further configured to encapsulate the packet header as an additional packet header distinct from packet headers of the sending protocol.

* * * * *